Figure 1:
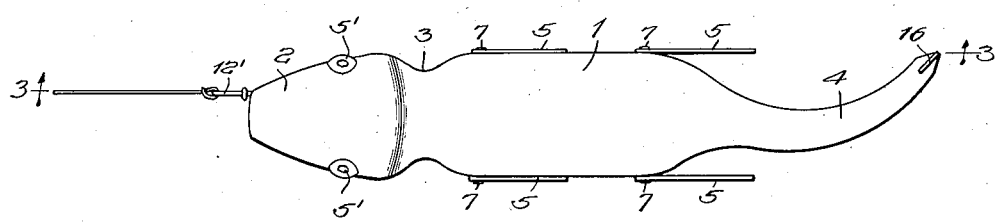

July 5, 1932. A. F. BOEHM 1,866,289

FISH LURE

Filed April 2, 1930

Witness:
William P. Kilroy

Inventor:
Albert F. Boehm
By Hill & Hill
Attys

Patented July 5, 1932

1,866,289

UNITED STATES PATENT OFFICE

ALBERT FRANK BOEHM, OF LAKE VILLA, ILLINOIS

FISH LURE

Application filed April 2, 1930. Serial No. 440,956.

My invention belongs to that general class of devices known as lures, and relates more particularly to an artificial bait particularly adapted for use as a casting or trolling bait for muskellunge, bass or other fish. The invention has among its objects the production of a simple, attractive, durable, inexpensive and efficient bait of the kind described for use wherever found applicable. More particularly the same has as an object the production of an attractive bait simulating a lizard or salamander which will be particularly effective for use during the season when the fish, owing to the season or other reasons, are not inclined to strike. In the northern waters of the United States, the same is particularly effective in the summer, such as in August when it is difficult to get a rise or strike. I attribute this disinclination of the fish to strike to the condition of the fish, as I believe that at this season of the year the mouth or teeth of the fish are extremely tender. In other parts of the country this season may vary. I have found that a live lizard or salamander makes a very attractive bait, but the same is often difficult to secure in the live state and when once effectively struck at, is mutilated and torn, thereby rendering the same unattractive. The use of a live bait is also distasteful to many people who hesitate to secure the same on the hook and consider the practice of so securing the bait as not being humane.

The present bait is particularly intended for the catching of muskellunge, but I have frequently caught bass and other fish on the same. The device is practically weedless and consequently, may be employed where there are weeds, grasses or snags.

Many other objects and advantages will be obvious from the disclosure herein given and more particularly pointed out hereinafter.

To this end my invention consists in the novel construction, arrangement and combination of parts herein shown and described and more particularly pointed out in the claim.

Figure 2:
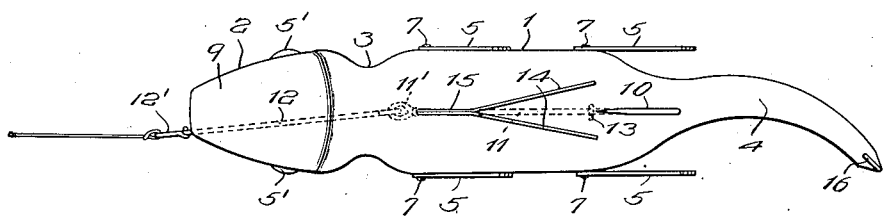
Figure 3:
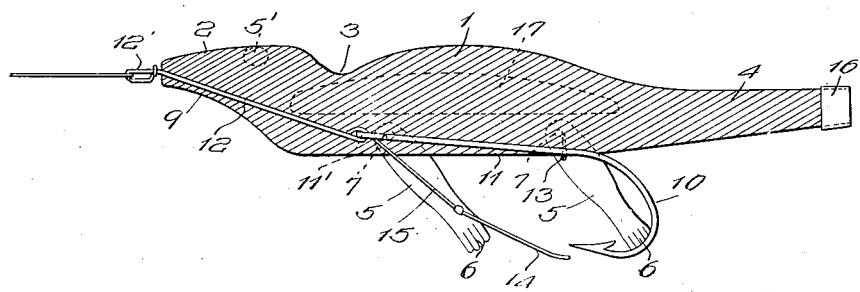

In the drawing, wherein like reference characters indicate like or corresponding parts:

Fig. 1 is a top plan view of the bait;
Fig. 2 is a plan view of the underside of the same; and
Fig. 3 is a sectional view taken substantially on the line 3—3 of Fig. 1 lengthwise through the bait.

Referring to the drawing in which one embodiment of the invention is shown, 1 represents a body portion which is fashioned to simulate a lizard or salamander, 2 being the head portion, 3 the neck, at the juncture of the head and body, and 4 the tail portion.

The body may be of any suitable material such as wood, pyroxylin plastic material, rubber or the equivalent. The same may be fashioned, molded or otherwise shaped up, depending upon the nature of the material and may be of any desired size, and painted or finished to produce the desired natural appearance. Ordinarily, I make the back and sides of a greenish or greenish brown color and the underside of a cream, light brown, or lighter color than the back and sides. It will be noted that the tail is preferably turned slightly to one side, past the medial line extending through the body part 1, the purpose of this being more fully explained hereinafter.

The body is provided with the desired number of legs as shown, two on either side. These legs 5 are preferably, but not necessarily made of flexible rubber, so that as the bait is drawn through the water, there is some movement of the legs. The legs also tend to serve as a blind for the hook means. The legs 5 may be provided with feet 6 and the same secured to the body by small nails 7 or equivalent means. Where the legs are made of rubber or the like which is flexible, they may be firmly secured to the body, but when made of material that is not flexible the same may be pivoted or otherwise movably secured to the body. Eyes 5' may be inserted in the body or painted on.

The head portion is cut up substantially as indicated at 9, so that as the lure is drawn through the water, it tends to rise to the surface, this being particularly desirable when the lure is made of material such as rubber or the like, which does not have the buoyancy of wood or other light weight material.

Projecting from the underside of the body is a hook 10, the shank of which extends forwardly and is embedded in the body and secured at the forward end in the loop 11' of a leader 12, which may be provided with an eye 12' for the attachment of the line or usual leader thereto. By placing the hook in the position as shown, the fish upon striking will be caught in the lower soft part of the mouth, the advantage of which is obvious. A staple 13, or equivalent means may be used, if found desirable to aid in more firmly securing the hook to the body of the bait. While the same may be provided with a double or treble hook, ordinarily, I have found the single hook sufficient. As shown, a guard may be provided, the shank portion 15 thereof being secured to the body with the ends 14—14 of the guard extending adjacent the end of the hook. The guard ends 14—14 are of flexible wire so that they readily yield when the bait is taken by a fish, but they are of sufficient stiffness to lift the lure through weeds, so that the hook 10 is not accidentally snagged. It will be noted that in this construction, the leader is secured directly to the hook so that if there is any strain on the hook, as for example, when the bait is taken by a large, powerful fish, the entire strain is transmitted directly through the leader 12 to the line or leader attached to the eye 13.

The inclined part 9 has been previously explained, this tending to cause the bait to plane or ride on the surface. If a sinker or spinner is placed in advance of the bait, this may have a tendency to cause the bait to travel under water, and may tend to counterbalance the lure, as the weight of the hook alone may position the lure in an angular position in the water. By varying the reeling of the bait, the bait may be given considerable action. It will be noted that the tail is twisted to one side. To some extent this acts as a rudder tending to cause the bait to travel to one side. If it is desired to counteract this travel, the leader 12 may be brought out at one side or the other of the mouth of the bait as most clearly shown in Figs. 1 and 2, thereby giving a slightly different action than if brought out at the medial line of the body. When the bait is drawn straight ahead, the curved tail, as before mentioned, tends to cause a somewhat irregular action of the bait, more or less, as if the tail was moving, and where the bait is traveling on the top of the water, causes a slight eddy in the water. This tends to attract the attention of the fish. At the tip of the tail, or at such other points as desired, a plate 16 of polished metal may be inserted. This will tend to cause a sparkle or flash in the water, particularly if the sun is shining, likewise attracting the fish.

As the bait is cast and then retrieved, the retrieving may be varied by varying the speed of reeling or lifting the pole during the reeling, and the action may also be varied by moving the pole from side to side. As the lure is drawn through the water, it appears to be a live lizard or salamander swimming, easy prey, and a tempting meal for a fish that might not be inclined to strike at the ordinary bait having the appearance of a fish, or similar hard bait. The same may be made in large and small sizes, and colored or ornamented to suit the individual taste of the angler. As mentioned before, the line may be weighted or the bait may be weighted to give the desired balance and also depth to the bait when in use. When the device is made of molded rubber, it may be provided with an air space, thereby increasing the buoyancy. This is indicated by the dotted line 17 in Fig. 3.

Having thus described my invention, it is obvious that various immaterial modifications may be made in the same without departing from the spirit of my invention; hence, I do not wish to be understood as limiting myself to the exact form, construction, arrangement, and combination of parts herein shown and described or uses mentioned.

What I claim as new and desire to secure by Letters Patent is:

A lure of the kind described comprising a body portion formed with a head at one end and a tail at the other, a reflector mounted adjacent the end of said tail, the body adjacent said head being reduced to provide a neck portion, the tail tapering rearwardly from the body and extending laterally to one side of the medial line of the body, a plurality of flexible leg members secured to the sides of the body and depending therefrom in an angular position, a hook projecting outwardly at an angle from the under side of the body, means for anchoring the shank of said hook at the point where it projects from the body, a leader secured to said hook and extending upwardly and in an off-set position through the body to the head and projecting therefrom, and a weeder element imbedded in said body and secured to said hook.

In witness whereof, I hereunto subscribe my name this 24th day of March, A. D. 1930.

ALBERT FRANK BOEHM.